July 13, 1965 R. A. SAUNDERS 3,194,111
VARIABLE SPACE INFRARED LIQUID MICROCELL
Filed Jan. 25, 1962 2 Sheets-Sheet 1

INVENTOR
RAYMOND A. SAUNDERS
BY
ATTORNEY

July 13, 1965 R. A. SAUNDERS 3,194,111
VARIABLE SPACE INFRARED LIQUID MICROCELL
Filed Jan. 25, 1962 2 Sheets-Sheet 2
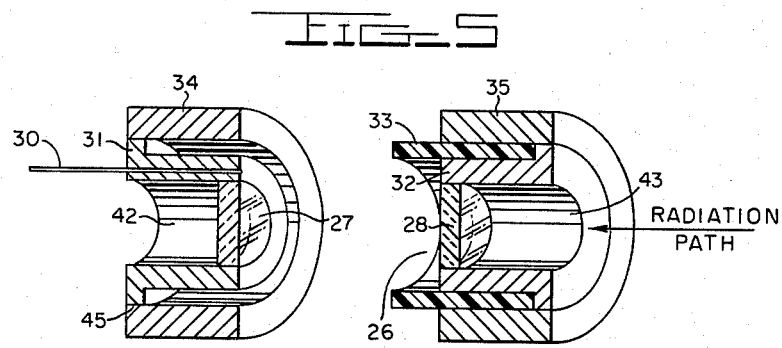
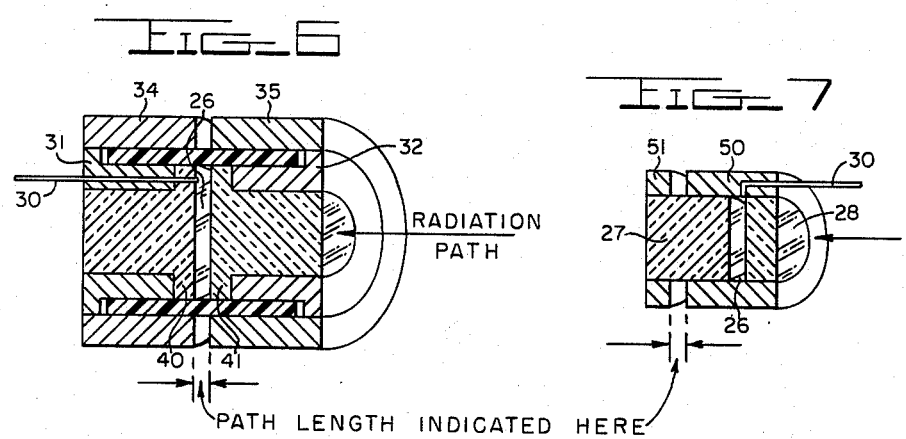
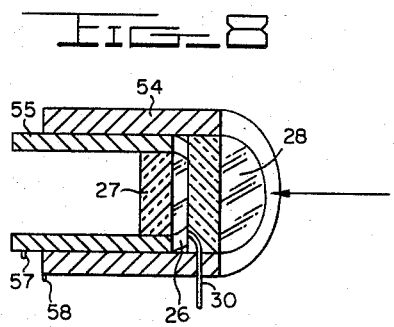
INVENTOR
RAYMOND A. SAUNDERS
BY
ATTORNEY United States Patent Office 3,194,111
Patented July 13, 1965

3,194,111
VARIABLE SPACE INFRARED LIQUID MICROCELL
Raymond A. Saunders, Hyattsville, Md., assignor to the United States of America as represented by the Secretary of the Navy
Filed Jan. 25, 1962, Ser. No. 168,852
1 Claim. (Cl. 88—14)
(Granted under Title 35, U.S. Code (1952), sec. 266)

The invention described herein may be manufactured and used by or for the Government of the United States of America for governmental purposes without the payment of any royalties, thereon or therefor.

The present invention relates to spectroscopy in general, and more particularly, to spectroscopy of very small samples.

To obtain spectra of very small liquid samples having all absorption bands in the desired transmission range, it has been necessary up to the present time for the spectroscopist to prepare a plurality of separate fixed-thickness cells before proceeding with the spectral analysis.

In processing the separate cells there has been considerable loss of the sample occurring with many filling or emptying operations. The procedure of using cells of fixed thickness requires also that there be two openings into the sample space, with filling of the sample space accomplished either by capillarity or by forcing or drawing the liquid into the cells through one of the openings by applying pressure or suction at the other. The fixed-thickness cells are made by grinding and polishing suitable alkali-halide crystalline material to produce window surfaces that are reasonably flat, parallel and transparent. Openings must be drilled through or into these windows, and the composite operation is difficult, expensive, and slow in completion, especially where very small, thin and fragile windows are required for the microcells.

The present invention is directed toward a liquid microcell which avoids the many disadvantages of fixed thickness cells and provides a microcell of variable space which permits the spectroscopist to obtain spectra of very small liquid samples of the order of 0.1 to 10 microliters at any desired optical pathlength. Only one sampling operation is required with the cell of the present invention.

Accordingly, it is an object of the present invention to provide a cell for containing microliquid samples in which many optical pathlengths are provided in a single cell.

It is another object of the present invention to provide a microcell for containing liquid samples which may be filled through one filling operation and with only one opening therein.

It is a further object of the present invention to provide a microcell for liquid samples which may accommodate conveniently samples of the order of 0.1 to 10 microliters.

It is a still further object of the present invention to provide a microcell for the spectroscopic analysis of small liquid samples in which no optical finishing is required of the cells.

It is a still further object of the present invention to provide microcells for liquid samples which are inexpensive to manufacture and easy and simple to assemble.

It is still a further object of the present invention to provide microcells for containment of up to 25 microliters which may be molded entirely from appropriate plastic except for crystal windows.

It is a still further object of the present invention to provide microcells for the spectroscopic analysis of liquids in which the windows are formed by pressure on a suitable alkali-halide crystal or powder, such as potassium bromide.

It is a further object of the present invention to provide microcells for containing liquid samples which are filled through a single opening by syringe-like action.

Other objects and many of the attendant advantages of this invention will be readily appreciated as the same becomes better understood by reference to the following detailed description when considered in connection with the accompanying drawings wherein:

FIG. 5 illustrates a second embodiment of the invention.

FIG. 6 illustrates a third embodiment of the present invention.

FIG. 7 illustrates a fourth embodiment of the invention.

FIG. 8 illustrates a fifth embodiment of the invention.

The present invention permits a spectroscopist to obtain spectra of very small liquid samples at any desired optical path with but only one cell and a single cell-filling operation. The spectroscopist can select the pathlength or pathlengths to give the optimum spectrum for the purpose desired.

Figure 1:
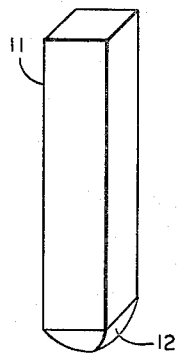
FIG. 1 illustrates a preliminary step in the forming of one embodiment of the invention.
Figure 2:
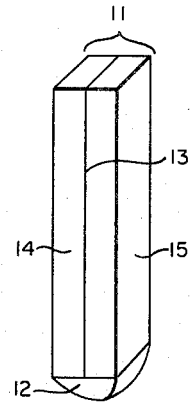
FIG. 2 illustrates a subsequent step in forming the embodiment of FIG. 1.
Figure 3:
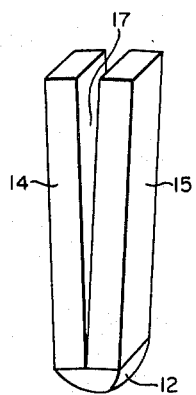
FIG. 3 illustrates a further step in forming the embodiment of FIG. 1.

Referring now to FIG. 1 there is shown an alkali-halide crystal 11, such as potassium bromide, which has a dab of an epoxy resin 12 at one end thereof. The crystal is split along the line 13 to form halves 14 and 15 as shown in FIG. 2, and then the two halves are opened slightly as shown in FIG. 3 to provide liquid sample opening 17.

Figure 4:
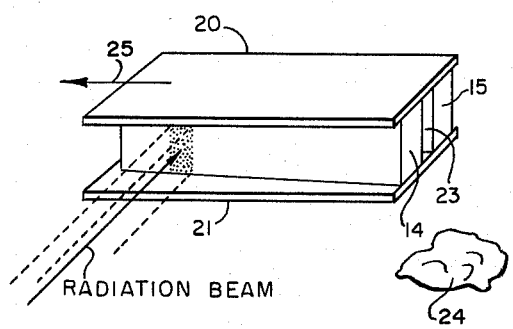
FIG. 4 illustrates the embodiment of FIG. 1 mounted for spectroscopic analysis of a liquid sample.

The portions 14 and 15 are joined as shown in FIG. 4 by plates 20 and 21 which are sealed to the crystal 11 by a cement which is impervious to the liquids to be examined. When the cement has hardened the cell is ready for use and is filled by touching a micro-pipette containing the sample liquid to the open end 23 of the cell. The cell fills instantly by capillary action and is stoppered where necessary by pressing a small tab of silicone rubber putty (uncured elastomer) 24 over open end 23 thereof. Silicone rubber putty or suitable pressure sensitive tape is used since the putty or tape adhesive is insoluble in most solvents, however, other similar components may be used if the silicone is soluble in a particular liquid being examined.

FIGS. 5 and 6 are sectional views of alternate variable space microcells, FIG. 5 showing a cell having a sample space 26, cylindrical, which is formed by pressed potassium bromide windows 27 and 28, solid structural members 31 and 32 and the hollow cylinder 33 preferably made of teflon. Filling tube 30 is inserted in a hole drilled in member 31, while exterior members 34 and 35 complete the components. In FIG. 6, members 31 and 32 have been cut away in the areas indicated at 40 and 41 so that windows 27 and 28 and cylinder 33 alone form sample space 26.

The microcells of FIGS. 5 and 6 provide variable pathlengths through movement apart or together of members 34 and 35. The cell components are prepared by first pressing into openings 42 and 43 of inner members 31 and 32 potassium bromide crystals or other suitable crystals. Sufficient pressure is applied to form a liquid tight seal between the crystals and the walls of openings 42 and 43, and also to form plane and parallel surfaces across the openings. Inner members 31 and 32 and outer members 34 and 35 are constructed to fit together in a press fit along surfaces 45, and tubular member 33 is constructed to fit similarly between the mating members 31 through 34 and 32 through 35. With components assembled as shown in FIGS. 5 and 6, and with windows 27 and 28 adjoining one another, a liquid introduced in filling tube 30 will be drawn into sample space 26 upon movement apart of the halves of the cell. Such movement apart provides a variable pathlength without permitting escape of fluid since the halves slide along tubular member 33 a distance limited only by the length of the tubular member. In FIG. 6, filling tube 30 passes through a portion of window 27. It will be appreciated that window 27 may be drilled or otherwise cored to accommodate filling tube 30 entirely therewithin where desired, for example, where it is necessary to avoid contact between the sample and cell members 34 and 35. Also, windows 27 and 28 in FIG. 6 may only partially fill their respective openings within the concept of this invention.

A die may be used to shape the windows, thereby providing means for rapidly forming any desired number of variable space cells. Structural members 34 and 35 are identical, as are members 31 and 32, thus requiring but three components—including tube 33—for completion of each cell. The die used to shape the windows may be constructed of any of a variety of materials having suficient rigidity to withstand the forces involved without deforming. Positioning means should be included in a die to hold member 31 or 32 a desired distance from the plane forming the window's inner surface so that a desired thickness at 40 or 41 may be obtained. Such details in the die are conventional and therefore will not be enlarged further herein.

The cells illustrated in FIGS. 7 and 8 are alternate embodiments of this invention and differ from those of FIGS. 5 and 6 generally in the absence of tube 33. In FIG. 7 sleeve 50 forms the circular periphery of sample space 26 and windows 27 and 28 the planar sides. Window 28 is pressed within one end of sleeve 50 forming a fluid tight seal therewith, while window 27 is shaped to form a press fit within the end opposite to that of window 28. Ring 51 is attached or pressed onto window 27 to provide means both for holding and moving window 27 axially along the radiation path and for determining exteriorly the thickness of sample space 26, it being noted that members 50 and 51 contact one another at zero thickness of the sample space. Sleeve 50 may extend axially any desired distance to form the maximum thickness of sample space desired, with window 27, of course, extended a comparable distance. Sleeve 50 may be made of a variety of materials having the rigidity necessary as well as being nonreactive with the fluid to be examined. In FIG. 8 sleeve 54 accommodates tubular member 55 in a press fit with windows 28 and 27 enclosing the ends, respectively, in fluid tight seals. Tabs 57 and 58 are attached to tube 55 and sleeve 54, respectively, to provide external means for determining the pathlength of sample space 26. Filling tube 30 is shown extending partly through sleeve 54 and partly through window 28, however, the filling tube may be placed in a number of positions, a determining factor being that the tube obscure as little as possible of the radiation path. The composition of sleeve 54 and tubular member 55 may be any of a number of materials having desired rigidity and non-reactiveness with the fluid or fluids to be examined. In FIG. 8 the pathlength is varied by simply sliding tubular member 55 within sleeve 54.

In each of FIGS. 7 and 8 window 28 is stationary while window 27 is movable to form the pathlength desired. These windows are formed in an appropriate testing and die assembly, or by similar means, by applying sufficient pressure to a predetermined quantity of either finely divided powder or to a single crystal of potassium bromide or NaCl or similarly formed crystalline structure. Since the windows are pressure formed in a component of the device, they require no optical finishing of any kind and are thus substantially less expensive to manufacture than conventional windows for such cells. In the embodiment of FIG. 4 variance of pathlength is obtained by lateral movement of the device along its longitudinal axis as indicated by the arrow 25, while in the embodiments of FIGS. 5 through 8 filling the sample space is accomplished by moving the windows apart from an initial position where they are in contact with one another. Subsequent movement apart will draw fluid into the sample space as well as increase pathlength; movement together after an initial separation will provide decreasing pathlength as well as extrusion of fluid through filling tube 30.

The invention thus provides a cell which permits a spectroscopist to obtain spectra which exhibit maximum absorption intensity for the sample quantity available and to reduce pathlength without expending sample fluid whereby pathlengths of lesser absorption intensity may be obtained. For example, with the taper cells of this invention a spectrum of liquid benzene can be obtained with all absorption bands within the useable transmission range. The cells will perform all desirable and necessary functions of conventional macro variable space cells and in addition can do this for spectral examination of very small samples, of the order of 0.1 to 25 microliters, at optical pathlengths of from zero to one mm. or greater.

Obviously many modifications and variations of the present invention are possible in the light of the above teachings. It is therefore to be understood that within the scope of the appended claims the invention may be practiced otherwise than as specifically described.

What is claimed is:

A variable spaced liquid microcell for providing a wide range of absorption intensity measurements while requiring a minimum quantity of fluid sample comprising a pair of alkali-halide crystal transparent windows, said windows being transparent to electromagnetic radiation and positioned with the edge of one window adjoining the edge of the other window to form a V-shaped structure, side plate means sealed to respective pairs of diverging edges of said structure for providing a fluid tight seal thereat, said windows and said side plates defining a V-shaped cavity with said windows open at its point of greatest cross-sectional area, wherein said opening is of such dimension that said minimum quantity of fluid sample will enter by capillary action, and deformable sealing means for sealing off the cavity defined by said windows and said plate means whereby varying absorption intensities of any fluid confined within said cavity may be obtained by movement of said microcell in a direction longitudinal of said windows across the path of a radiation beam.

References Cited by the Examiner
UNITED STATES PATENTS

| | | | |
|---|---|---|---|
| 2,163,467 | 6/39 | Philipsen | 88—14 |
| 2,355,877 | 8/44 | LeVan | 125—30 |
| 2,595,082 | 4/52 | Kertesz | 88—14 |
| 2,690,694 | 10/54 | Wilson | 88—14 |
| 2,690,695 | 10/54 | Coates | 88—14 |
| 2,749,796 | 6/56 | Bauer | 88—14 |
| 3,036,215 | 5/62 | Jones et al. | |

JEWELL H. PEDERSEN, *Primary Examiner.*